(12) United States Patent
Mutter et al.

(10) Patent No.: US 11,838,146 B2
(45) Date of Patent: Dec. 5, 2023

(54) SUBSCRIBER STATION FOR A SERIAL BUS SYSTEM AND METHOD FOR COMMUNICATING IN A SERIAL BUS SYSTEM

(71) Applicant: Robert Bosch GmbH, Stuttgart (DE)

(72) Inventors: Arthur Mutter, Neuhausen (DE); Florian Hartwich, Reutlingen (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 51 days.

(21) Appl. No.: 17/594,376

(22) PCT Filed: Apr. 8, 2020

(86) PCT No.: PCT/EP2020/060001
§ 371 (c)(1),
(2) Date: Oct. 13, 2021

(87) PCT Pub. No.: WO2020/212218
PCT Pub. Date: Oct. 22, 2020

(65) Prior Publication Data
US 2022/0209986 A1 Jun. 30, 2022

(30) Foreign Application Priority Data
Apr. 16, 2019 (DE) ............. 10 2019 205 488.9

(51) Int. Cl.
*H04L 12/43* (2006.01)
*H04L 12/413* (2006.01)
(Continued)

(52) U.S. Cl.
CPC .......... *H04L 12/413* (2013.01); *H04L 5/0078* (2013.01); *H04L 17/30* (2013.01); *H04L 7/00* (2013.01)

(58) Field of Classification Search
CPC ..... H04L 12/413; H04L 5/0078; H04L 17/30; H04L 7/00; H04L 12/40013;
(Continued)

(56) References Cited

U.S. PATENT DOCUMENTS 4,663,744 A * 5/1987 Russell ............... G01V 1/22
367/78
6,111,888 A * 8/2000 Green ............... H04L 12/40026
370/461
(Continued)

FOREIGN PATENT DOCUMENTS

CN 102804697 A 11/2012
CN 103281227 A 9/2013
(Continued)

OTHER PUBLICATIONS

ISO 11898-1:2015 Standard, 2015, pp. 1-74.
International Search Report for PCT/EP2020/060001 dated Jun. 26, 2020.

*Primary Examiner* — Stephen M D Agosta
(74) *Attorney, Agent, or Firm* — NORTON ROSE FULBRIGHT US LLP; Gerard Messina

(57) ABSTRACT

A subscriber station for a serial bus system. The subscriber station has a communication control device for controlling a communication of the subscriber station with at least one other subscriber station of the bus system, a transmitting/receiving device for transmitting a transmission signal in a frame on a bus of the bus system, and a scheduling unit for scheduling a temporal access of the subscriber station to the bus in at least one time slot of a cycle of temporally consecutive time slots, at least one time slot being provided in a cycle for each subscriber station for transmitting its transmission signal and the cycle repeating cyclically. The scheduling unit is designed to determine an assignment that specifies which time slot of the cycle the transmitting/
(Continued)

receiving device is allowed to use for transmitting the frame for the transmission signal on the bus.

22 Claims, 5 Drawing Sheets

(51) Int. Cl.
*H04L 5/00* (2006.01)
*H04L 17/30* (2006.01)
*H04L 7/00* (2006.01)

(58) Field of Classification Search
CPC . H04L 12/4015; H04L 5/0048; H04L 5/1469; H04L 2012/40215; H04L 5/0091; H04L 5/0094; H04L 5/22; H04L 12/40019
See application file for complete search history.

(56) References Cited

U.S. PATENT DOCUMENTS

| | | | |
|---|---|---|---|
| 6,490,293 B1 | 12/2002 | Barker | |
| 7,096,295 B2 * | 8/2006 | Hartwich | H04J 3/0655 710/266 |
| 8,155,769 B2 * | 4/2012 | Chandhoke | G05B 19/0426 700/86 |
| 8,700,836 B2 * | 4/2014 | Fredriksson | G06F 13/3625 710/118 |
| 11,616,660 B2 * | 3/2023 | Bouchet | H04L 12/4015 710/107 |
| 11,716,225 B2 * | 8/2023 | Chatterjee | H04L 5/0048 370/329 |
| 2003/0046417 A1 * | 3/2003 | Ellis | H04L 12/4015 709/232 |
| 2005/0111357 A1 * | 5/2005 | Rogers | H04L 47/125 370/352 |
| 2009/0144647 A1 * | 6/2009 | Chandhoke | G06F 8/00 700/117 |
| 2009/0327549 A1 * | 12/2009 | Fuehrer | G06F 11/0745 710/107 |
| 2010/0002753 A1 * | 1/2010 | Lucas | H04B 3/54 375/145 |
| 2010/0070748 A1 * | 3/2010 | Duan | H04L 12/40006 703/2 |
| 2010/0229046 A1 * | 9/2010 | Fuehrer | G06F 9/546 710/107 |
| 2011/0038388 A1 * | 2/2011 | Hartwich | H04L 7/0331 370/503 |
| 2011/0167188 A1 * | 7/2011 | Hartwich | H04L 12/40032 710/305 |
| 2014/0046574 A1 * | 2/2014 | Eisenbarth | F02P 5/1518 701/105 |
| 2015/0009874 A1 * | 1/2015 | Edara | H04W 72/1268 370/311 |
| 2015/0033016 A1 * | 1/2015 | Thornton | H04L 9/0869 713/171 |
| 2015/0063371 A1 * | 3/2015 | Horvath | H04L 12/40 370/461 |
| 2017/0245293 A1 * | 8/2017 | Kellermann | H04L 12/4035 |
| 2022/0209984 A1 * | 6/2022 | Mutter | H04L 12/417 |

FOREIGN PATENT DOCUMENTS

| | | |
|---|---|---|
| CN | 107113087 A | 8/2017 |
| DE | 69807235 T2 | 12/2002 |
| EP | 0952707 A2 | 10/1999 |
| EP | 1223711 A2 | 7/2002 |

* cited by examiner

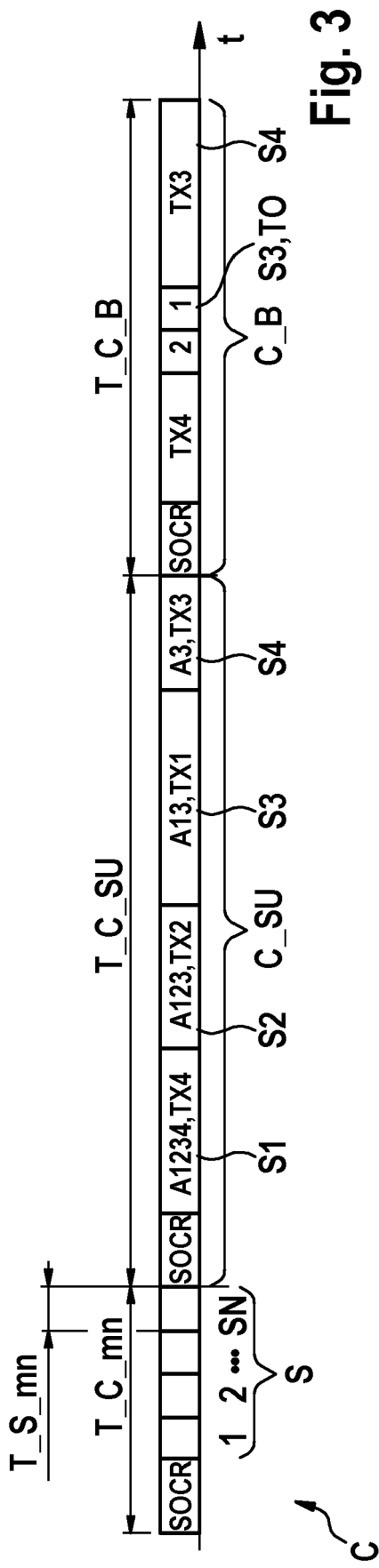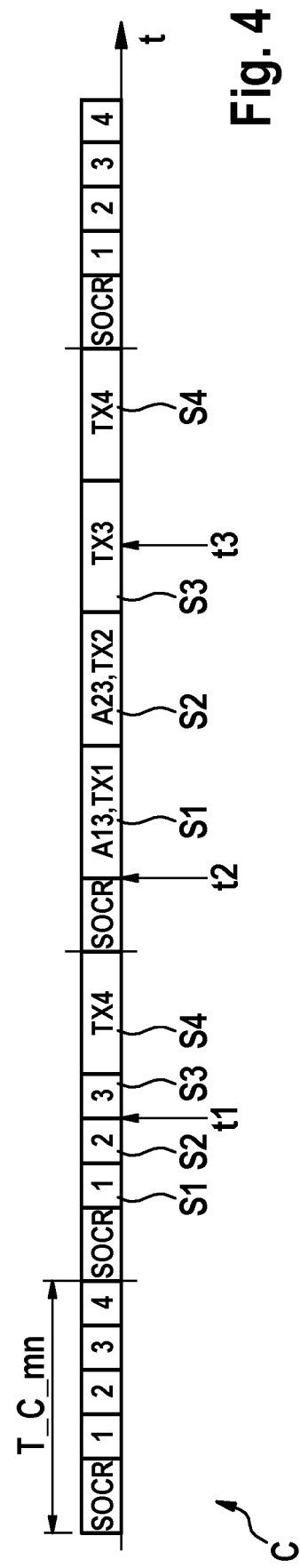

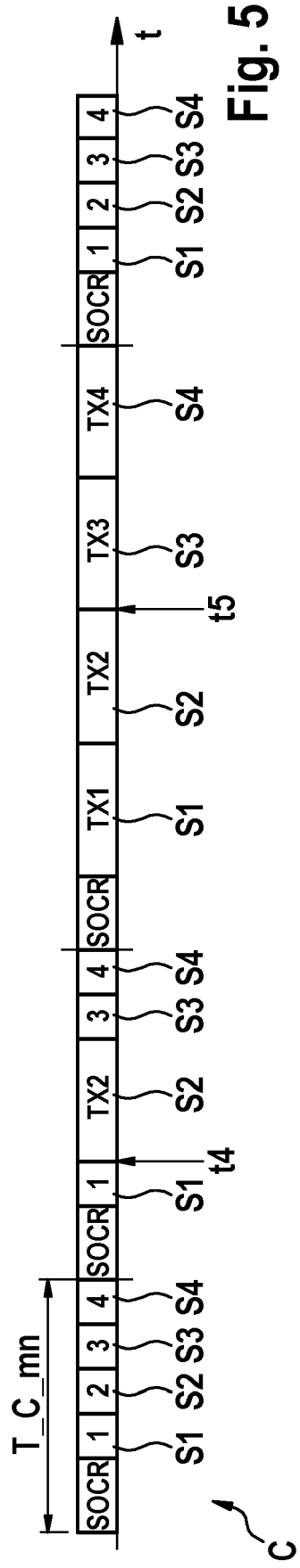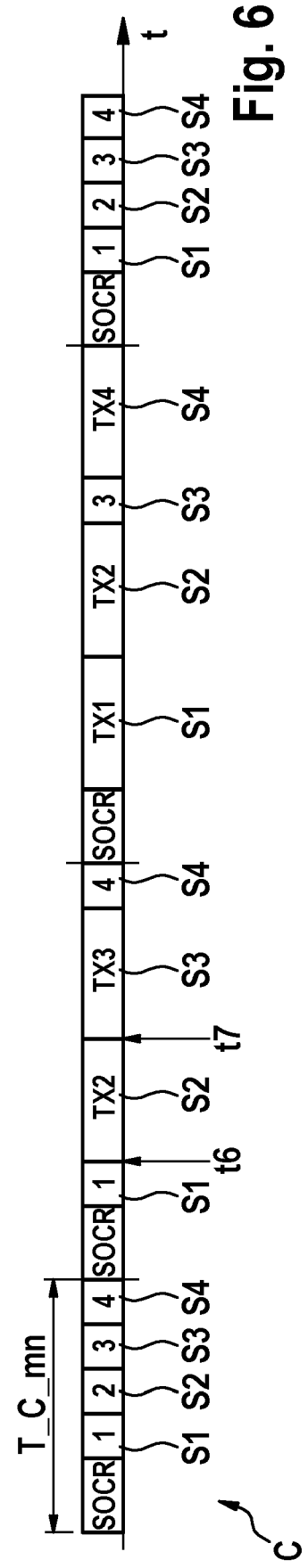

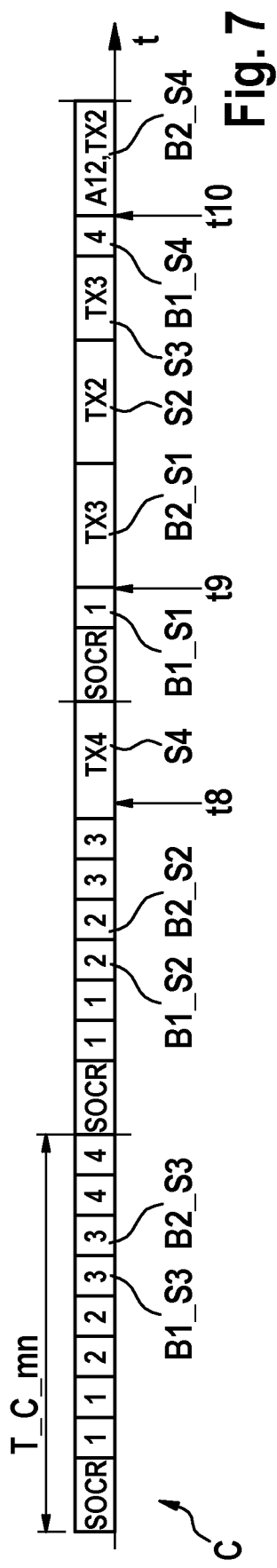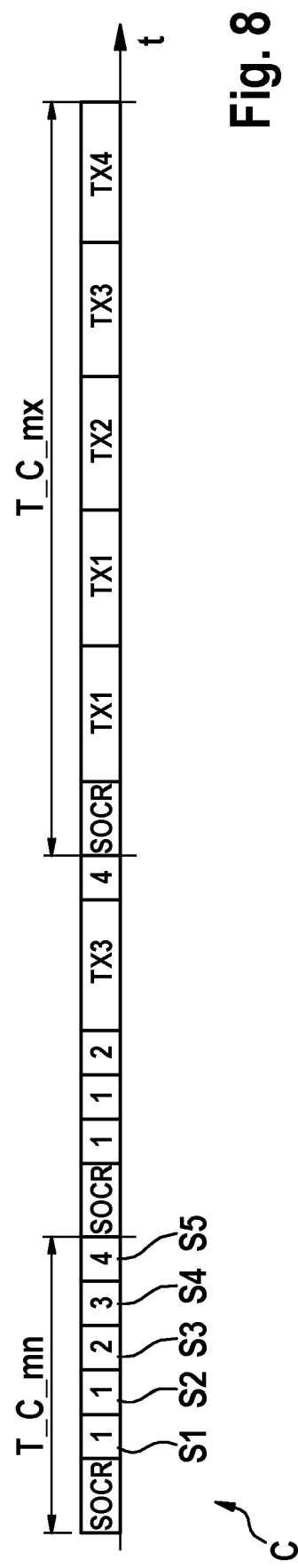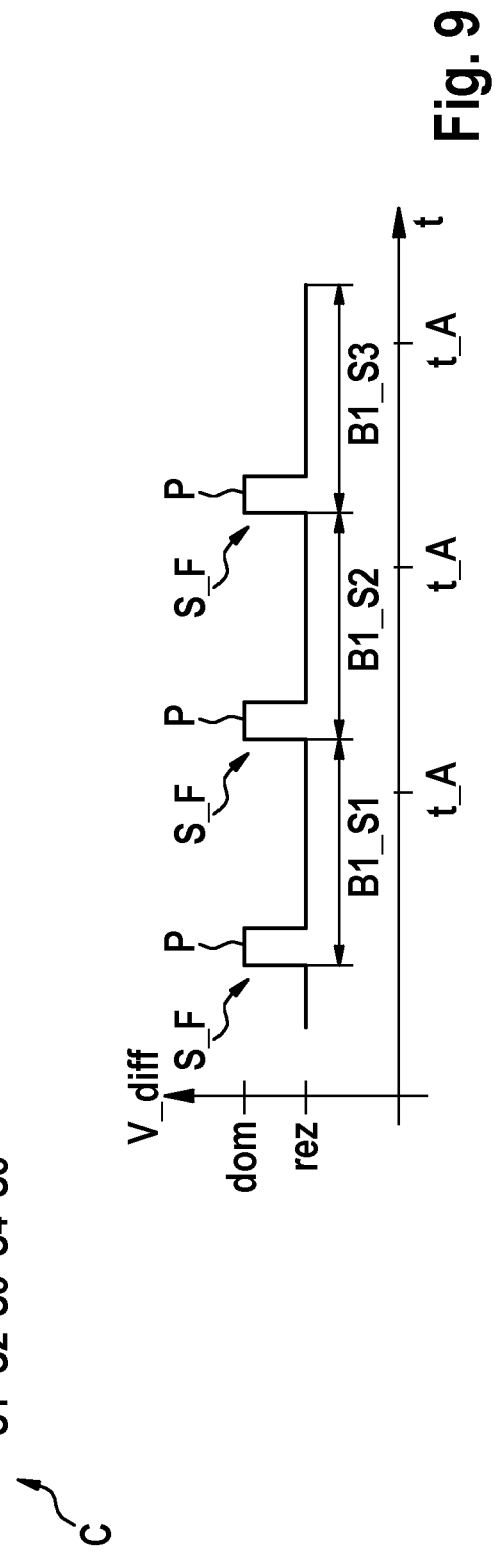

SUBSCRIBER STATION FOR A SERIAL BUS SYSTEM AND METHOD FOR COMMUNICATING IN A SERIAL BUS SYSTEM

FIELD

The present invention relates to a subscriber station for a serial bus system and to a method for communicating in a serial bus system, which allow for communication in real time critical applications.

BACKGROUND INFORMATION

For communication between sensors and control units, for example in vehicles, a bus system is used ever more frequently, instead of a point-to-point connection, for reasons of costs, data being transmitted in the bus system as messages by CAN FD in the ISO 11898-1:2015 standard as the CAN protocol specification. The messages are transmitted between the subscriber stations of the bus system such as sensors, control units, transmitters, etc. Currently, CAN FD is used in the introductory phase in the first step usually at a data bit rate of 2 MBit/s in the transmission of bits of the data field and at an arbitration bit rate of 500 kbit/s in the transmission of bits of the arbitration field in the vehicle.

To prevent collisions of messages of different subscriber stations on the bus, CAN uses the CSMA/CR method (CR=collision resolution). Collisions are thereby resolved using a so-called arbitration at the beginning of a message or a frame. In the arbitration, an identifier (ID) is evaluated to determine which message may be transmitted next. In the process, the message or frame prevails whose identifier has the highest priority. This corresponds to strict priority scheduling. This suffices for many applications in the autonomous vehicle.

The arbitration has the effect, however, that current CAN-based bus systems cannot be used for cases of application that require a 100% deterministic bus access, that is, a guarantee that a subscriber station of the bus system is definitely able to transmit a message or a frame at a certain time.

SUMMARY

It is an object of the present invention to provide a subscriber station for a serial bus system and a method for communicating in a serial bus system, which resolve the aforementioned problems. In particular, a subscriber station for a serial bus system and a method for communication are to be provided, which are usable in a communication for real time critical applications and in which in particular a 100% deterministic bus access is possible.

The object may be attained by a subscriber station for a serial bus system in accordance with an example embodiment of the present invention. In accordance with an example embodiment of the present invention, the subscriber station has a communication control device for controlling a communication of the subscriber station with at least one other subscriber station of the bus system, a transmitting/receiving device for transmitting a transmission signal generated by the communication control device in a frame on a bus of the bus system, and a scheduling unit for scheduling a temporal access of the subscriber station to the bus in at least one time slot of a cycle of temporally consecutive time slots, at least one time slot being provided in a cycle for each subscriber station of the bus for transmitting its transmission signal and the cycle repeating cyclically, and the scheduling unit being designed to determine, by using at least one item of information received from the bus, an allocation that specifies which time slot of the cycle the transmitting/receiving device may use for transmitting the frame for the transmission signal on the bus.

In a bus system, to which the subscriber stations described above are connected, it is ensured that every subscriber station is deterministically able to access the bus. Consequently, each of the subscriber stations receives a guaranteed minimum communication bandwidth on the bus at least for the time, during which the bus is to be accessed deterministically. This makes it possible to implement real-time critical applications using even a CAN-based bus system.

The subscriber station may be used with any communication protocol that operates in accordance with the CSMA/CR method, for example with any CAN-based communication protocol, in particular, however, with CAN XL, a CAN FD successor.

In the example subscriber station, it is also very advantageous that it is possible to activate the function of the deterministic scheduling for the deterministic bus access, as needed, even in continuous operation. The subscriber station is thus designed to carry out two different communication methods, namely, to carry out either a CSMA/CR method, which implements "strict priority scheduling", or a CSMA/CR method with additional deterministic scheduling. This is a great advantage compared to bus systems, in which respectively only one of the mentioned communication methods is possible, such as for example 10BASE-TIS, Flexray, etc. A further very great advantage is that the approach described here is considerably simpler in terms of configuration and use than previous methods.

The described subscriber station in accordance with an example embodiment of the present invention is designed in such a way that it itself organizes, together with the other subscriber stations on the bus, which subscriber station may transmit the next message. The configuration of the subscriber station and of the associated bus system is thus self-organizing. This makes the configuration very simple to accomplish. As a result, there is hardly any additional personnel training required for configuring the bus system and the subscriber station.

An additional advantage of the subscriber station is the fact that no "single point of failure" is possible, as is the case in the master node required for 10BASE-T1S. That is to say, when a subscriber station fails due to a defect and therefore no longer transmits anything, this has no negative effects on the communication on the bus.

Depending on the implemented variant of the deterministic scheduling, the subscriber station may provide either the same maximum delays (worst case delays) as PLCA of 10BASE-T1S or maximum delays (worst case delays) that are shorter by approximately 50% than PLCA of 10BASE-T1S.

Additionally, it is possible to extend the subscriber station, depending on the application or desire, with many additional functions, since the arbitration is always available. For transmission, it is possible for example to make use of an unused time slot of another subscriber station of the bus system. It is also possible to implement a weighted cyclical transmission (weighted round robin), in which some subscriber stations are allowed to transmit more messages per cycle or round than other subscriber stations. Another option is for a subscriber station of the bus system to be able to transmit in its time slot during a cycle also multiple shorter messages instead of one message of maximum length. This allows for fairness regarding the bandwidth available on the bus, instead of merely with regard to the number of messages transmitted or transmittable by each subscriber station.

As a consequence, the subscriber station can be used to implement a transmission and reception of messages with great flexibility with regard to bus access, and thereby a very great range of quality of service requirements and thus applications may be realized.

Advantageous further developments of the subscriber station in accordance with the present invention are disclosed herein.

The at least one item of information received from the bus is possibly a frame informing of the start of the cycle, the at least one item of information received from the bus additionally comprising a frame identifier and/or an assignment of the time slots of a cycle to the subscriber stations of the bus and/or the information as to which of the subscriber stations of the bus is currently transmitting.

According to one exemplary embodiment of the present invention, the scheduling unit is designed to use, as the at least one item of information received from the bus, at least the frame informing of the start of the cycle and to evaluate a frame identifier of a transmitter of a frame received from the bus.

According to another exemplary embodiment of the present invention, the scheduling unit is designed to evaluate a data field of the frame informing of the start of the cycle, in which the at least one item of information received from the bus is contained.

According to yet another exemplary embodiment of the present invention, the scheduling unit is designed to wait until the communication control device has received a frame informing of the start of the cycle from the bus, and subsequently to determine, together with the other subscriber stations of the bus in the operation of the bus system by using a priority of the transmission signal, which time slot of the cycle the transmitting/receiving device may use for transmitting the frame for the transmission signal on the bus.

It is possible for the communication control device to be designed to partition the frame, at least in a power up phase of the bus, into a first communication phase and a second communication phase, it being negotiated in the first communication phase, which of the subscriber stations of the bus obtains an at least temporarily exclusive, collision-free access to the bus in the subsequent second communication phase.

It is possible that the number of time slots per cycle is greater than the number of time slots assigned to the subscriber stations of the bus per cycle, it being negotiated in the first communication phase in a time slot that is not assigned to a subscriber station of the bus, which of the subscriber stations of the bus gains at least temporarily exclusive, collision-free access to the bus in the subsequent second communication phase.

Optionally, the minimum duration of a time slot may be selected as a bit time of a bit of the first communication phase. Optionally, the scheduling unit is designed to transmit, in a time slot assigned to the subscriber station, a frame with a priority that is higher than a priority of a frame, which the scheduling unit is designed to transmit in a time slot that is assigned to another subscriber station of the bus.

Alternatively, it is possible that the minimum duration of a time slot is two bit times of a bit of the first communication phase, the scheduling unit being designed to approve a temporal access of the subscriber station to the bus in the second bit of a time slot of the cycle, if the subscriber station or another subscriber station of the bus in the first bit of the time slot lets its transmission opportunity elapse unused.

According to a special variant of an embodiment of the present invention, the scheduling unit has a counting module, which is designed to increment its count value with every frame received from the bus and to increment it with every transmission opportunity for a time slot that elapsed unused, the counting module being designed to set its count value to 1 if the frame informing of the start of the cycle was received.

In this case, the counting module may be designed to increment its count value with every frame received from the bus following the reception of a bit, which signals the beginning of a frame, even if the frame is later aborted by the subscriber station transmitting the frame due to an error. In this case, the scheduling unit may be designed to approve a temporal access of the subscriber station on the bus for the next time slot of the cycle, if the count value of the counting module is equal to the number of the time slot assigned to the subscriber station.

According to one exemplary embodiment of the present invention, the scheduling unit is designed to approve a temporal access of the subscriber station to the bus in a time slot of the cycle if another subscriber station of the bus lets its transmission opportunity elapse unused.

The communication control device may be designed to include in the transmission signal a subscriber station number, which on the bus is exclusively assigned to the subscriber station, the scheduling unit being designed to approve a temporal access of the subscriber station to the bus in the time slot assigned to the subscriber station, if the scheduling unit is able to evaluate a subscriber station number in a frame received from the bus. In this manner, using this information, the scheduling unit is able to ascertain its own time slot.

In one development of the present invention, the number of time slots that are assigned to the subscriber station per cycle may be at least temporarily unequal to a number of time slots that are assigned to another subscriber station of the bus per cycle.

In another development of the present invention, the subscriber station may be designed to transmit more than one frame per time slot on the bus. Additionally or alternatively, the number of frames that the subscriber station is allowed to transmit per time slot on the bus is at least temporarily unequal to a number of frames that another subscriber station of the bus is allowed to transmit per time slot on the bus.

Optionally, the communication control device is designed to transmit at the beginning of a recessive bit in the time slot assigned to the subscriber station a dominant pulse that is shorter than the bit time of the recessive bit, if the communication control device lets its transmission opportunity elapse unused.

According to another option of the present invention, the subscriber station is designed in such a way that the scheduling unit may be switched on or off depending on the time requirements of the communication on the bus, or that an operating mode of the scheduling unit is changeable by configuration of predetermined parameters in the continuous operation of the bus system, the operating mode of the scheduling unit setting a predetermined mode of a communication on the bus.

At least two of the subscriber stations described above may be part of a bus system, which additionally comprises a bus, the at least two subscriber stations being connected to one another via the bus in such a way that they are able to communicate serially with one another. In this case, at least one of the subscriber stations may be a master subscriber station for transmitting a frame, which informs the at least two subscriber stations of the start of a cycle of a communication on the bus, at least one backup master being optionally provided for the additional execution of the function of the master subscriber station on the bus. A subscriber station is thus able to function simultaneously as a subscriber and as a master.

The aforementioned object may additionally be achieved by a method for communicating in a serial bus system according to an example embodiment of the present invention. In accordance with an example embodiment of the present invention, the method is carried out using a subscriber station of the bus system, which comprises a communication control device and a transmitting/receiving device, the method comprising the steps of controlling, using a communication control device, a communication of the subscriber station with at least one other subscriber station of the bus system, and transmitting, using a transmitting/receiving device, a transmission signal generated by the communication control device in a frame on a bus of the bus system according to the schedule of a scheduling unit, which schedules a temporal access of the subscriber station to the bus in at least one time slot of a cycle of temporally consecutive time slots, at least one time slot being provided in a cycle for each subscriber station of the bus for transmitting its transmission signal and the cycle repeating cyclically, and the scheduling unit determining, by using at least one item of information received from the bus, an assignment that determines which time slot of the cycle the transmitting/receiving device may use for transmitting the frame for the transmission signal on the bus.

The method offers the same advantages as were mentioned above with reference to the subscriber station.

Additional possible implementations of the present invention also include combinations of features or specific embodiments not explicitly mentioned above or below with regard to the exemplary embodiments. One skilled in the art will also add individual aspects as improvements or supplementations to the respective basic form of the present invention, in view of the disclosure herein.

BRIEF DESCRIPTION OF THE DRAWINGS

The present invention is described below in greater detail with reference to the figures and on the basis of exemplary embodiments.

FIG. 3 shows a timing diagram illustrating the sequence of a communication in the bus system according to the first exemplary embodiment of the present invention.

FIG. 4 shows a timing diagram illustrating the sequence of a communication in the bus system according to the first exemplary embodiment of the present invention, after a subscriber station was woken up again.

FIG. 5 shows a timing diagram illustrating the sequence of a communication in a bus system according to a second exemplary embodiment of the present invention.

FIG. 6 shows a timing diagram illustrating the sequence of a communication in a bus system according to a third exemplary embodiment of the present invention.

FIG. 7 shows a timing diagram illustrating the sequence of a communication in a bus system according to a fourth exemplary embodiment of the present invention.

FIG. 8 shows a timing diagram illustrating the sequence of a communication in a bus system according to a fifth exemplary embodiment of the present invention.

FIG. 9 shows a time characteristic of a differential bus signal in unused time slots in a bus system according to a sixth exemplary embodiment of the present invention.

Unless indicated otherwise, identical or functionally equivalent elements are provided with the same reference characters in the figures.

DETAILED DESCRIPTION OF EXAMPLE EMBODIMENTS

Figure 1:
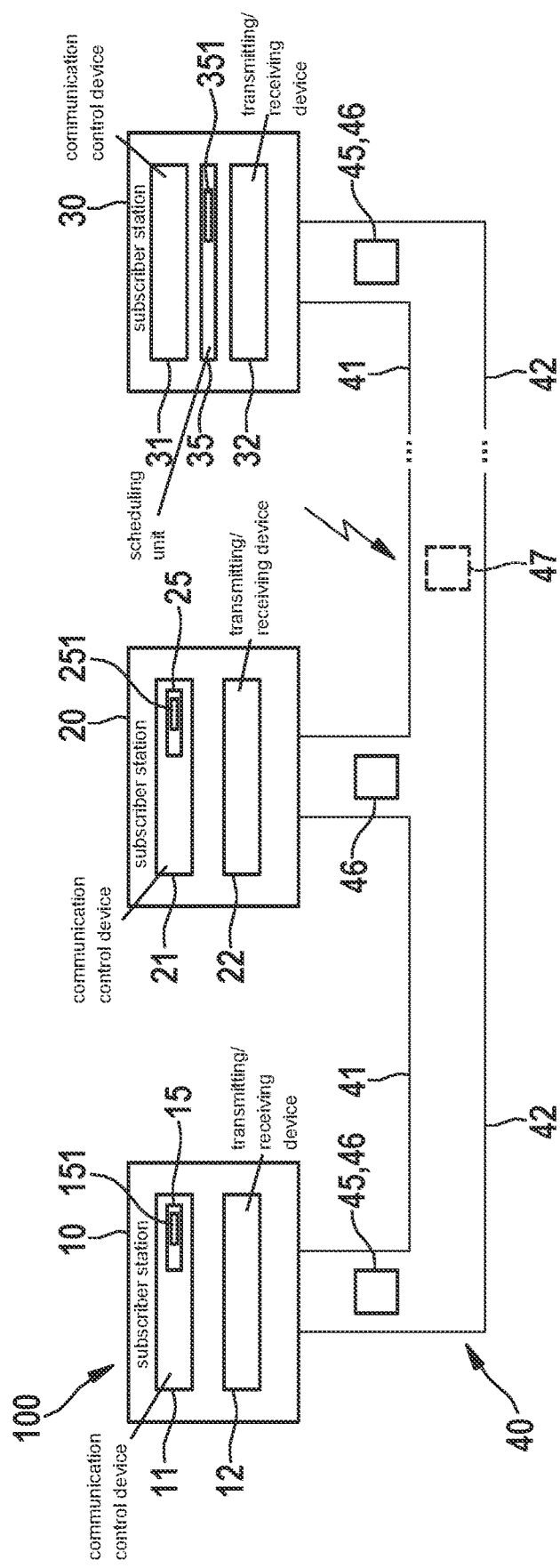
FIG. 1 shows a simplified block diagram of a bus system according to a first exemplary embodiment of the present invention.

FIG. 1 shows as an example a bus system 100, which is fundamentally developed in particular as a CAN bus system and/or a CAN FD bus system and/or a CAN FD successor bus system, which is here called a CAN XL bus system, and/or variants of the same, as described below. Bus system 100 may be used in a vehicle, in particular a motor vehicle, in an aircraft etc., or in a hospital etc.

In FIG. 1, bus system 100 has a plurality of subscriber stations 10, 20, 30, which are respectively connected to a bus 40 having a first bus wire 41 and a second bus wire 42. Bus wires 41, 42 may also be called CAN_H and CAN_L or CAN-XL_H and CAN-XL_L and are used for electrical signal transmission after coupling in the dominant levels or generating recessive levels for a signal in the transmission state. Messages 45, 46 are serially transmittable via bus 40 in the form of signals between the individual subscriber stations 10, 20, 30. If an error occurs in the communication on bus 40, as illustrated by the jagged black arrow in FIG. 1, an error frame (error flag) 47 may be optionally transmitted. Subscriber stations 10, 20, 30 are for example control units, sensors, display devices, etc. of a motor vehicle.

As shown in FIG. 1, subscriber station 10 has a communication control device 11, a transmitting/receiving device 12 and a scheduling unit 15 including a counting module 151. Subscriber station 20 has a communication control device 21, a transmitting/receiving device 22 and a scheduling unit 25 including a counting module 251. Subscriber station 30 has a communication control device 31, a transmitting/receiving device 32 and a scheduling unit 35 including a counting module 351. Transmitting/receiving devices 12, 22, 32 of subscriber stations 10, 20, 30 are each connected directly to bus 40, even if this is not illustrated in FIG. 1.

Communication control devices 11, 21, 31 are respectively used for controlling a communication of the respective subscriber station 10, 20, 30 via bus 40 with at least one other subscriber station of the subscriber stations 10, 20, 30 that are connected to bus 40.

Communication control devices 11, 31 generate and read first messages 45, which are CAN messages for example that are constructed on the basis of a CAN XL format, which is described in more detail with reference to FIG. 2. Communication control devices 11, 31 may be additionally designed to provide, as needed, a Can XL message 45 or a CAN FD message 46 for transmitting/receiving devices 12, 32 or to receive such from the latter. Communication control devices 11, 31 thus generate and read a first message 45 or a second message 46, the first and second messages 45, 46 being differentiated by their data transmission standard, namely, in this case CAN XL or CAN FD.

Communication control device 21 may be developed like a conventional CAN controller in accordance with ISO 11898-1:2015, in particular like a CAN FD-tolerant classical CAN controller or a CAN FD controller. Communication control device 21 generates and reads second messages 46, for example classical CAN messages or CAN FD messages 46. The CAN FD messages 46 may comprise a number from 0 to 64 data bytes, which additionally are transmitted at a markedly faster data rate than in the case of a classical CAN message. In particular, except for unit 25, communication control device 21 is developed like a conventional CAN or CAN FD controller.

Transmitting/receiving device 22 may be developed like a conventional CAN transceiver in accordance with ISO 11898-2:2016 or CAN FD transceiver. Transmitting/receiving devices 12, 32 may be designed to provide, as needed, messages 45 or bits of a frame in accordance with the CAN XL format or messages 46 or bits of a frame in accordance with the current CAN FD format for the associated communication control device 11, 31 or to receive such from the latter.

Using the two subscriber stations 10, 30, it is possible to generate and then transmit messages 45 in the CAN XL format and to receive such messages 45.

Figure 2:
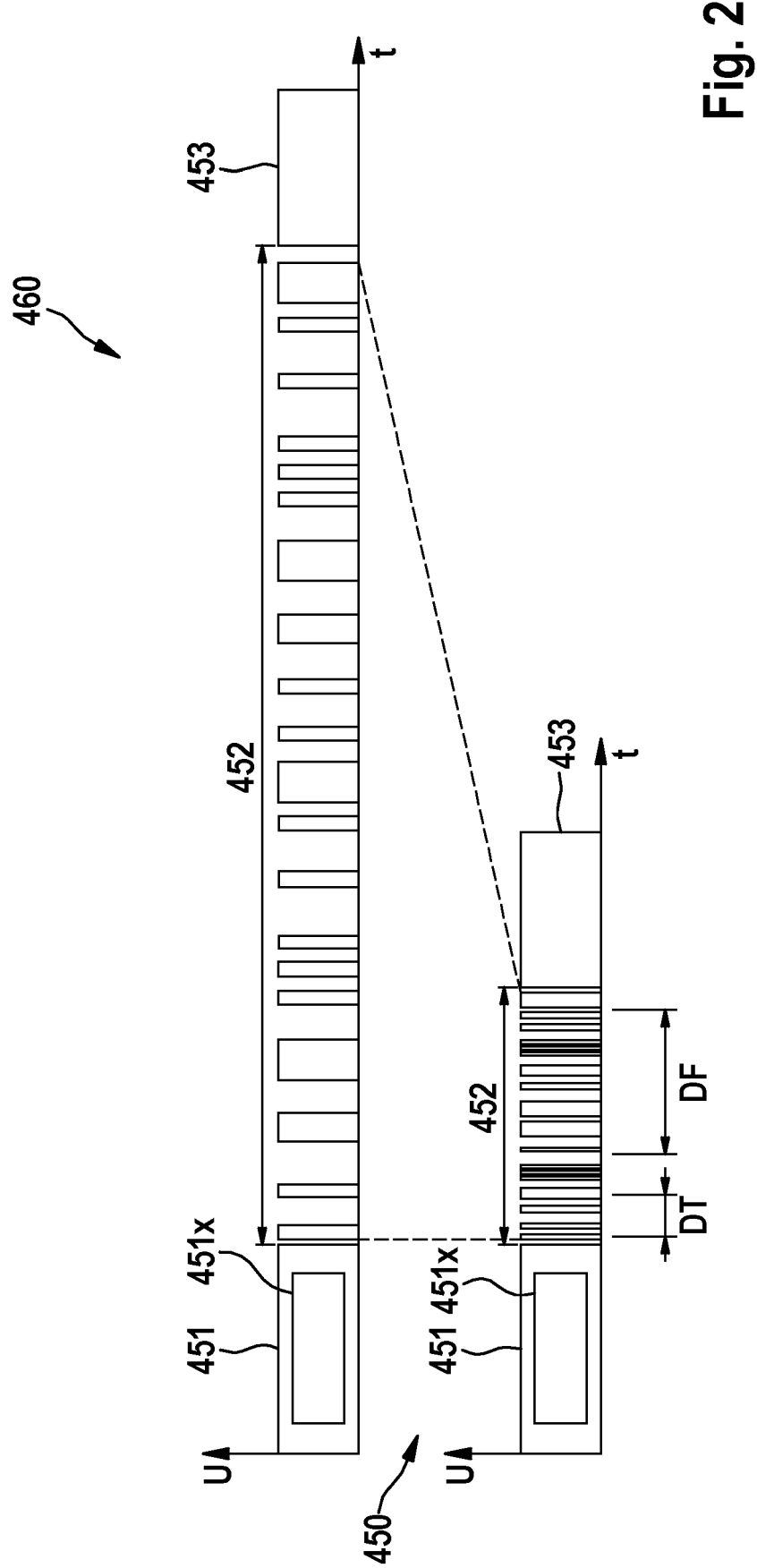
FIG. 2 shows a diagram illustrating the structure of messages that may be transmitted by subscriber stations of the bus system according to the first exemplary embodiment of the present invention.

FIG. 2 shows in its upper section for message 46 a CAN FD frame 460, as it is transmitted serially on bus 40 by transmitting/receiving device 12 or transmitting/receiving device 22 or transmitting/receiving device 32 over time t. The lower section of FIG. 2 shows for message 45 a special example of a CAN XL frame 450, as it may be transmitted serially on bus 40 by transmitting/receiving device 22 or 32 over time t. Alternatively, the upper section of FIG. 2 may be interpreted as a classical CAN frame and the lower section of FIG. 2 may be interpreted as a CAN FD frame or CAN XL frame.

According to FIG. 2, for the CAN communication on bus 40, frames 450, 460 are partitioned into different communication phases 451, 452, 453, namely, an arbitration phase 451, a data phase 452, and an end of frame phase 453. In the arbitration phase 451 at the start of frame 450, 460, the associated transmitting/receiving device 12, 22, 32 transmits an identifier 451x and a portion of a control field. In the data phase 452, the following data are transmitted inter alia: a portion of the control field, the user data of the CAN XL frame or of message 45, 46 in a data field DF and a checksum. In a frame 450, a portion of the control field may be an optional DataType field DT, which indicates the type of data that are transmitted in data field DF. For illustrative purposes, DataType field DT is shown in FIG. 2 having a greater length than it often has in relation to the length of the data field DF. DataType field DT may be transmitted in the control portion of the frame 450, 460, in particular at the start of data phase 452, or at the end of arbitration phase 451. Data phase 452 is followed by the end of frame phase 453, which also belongs to the arbitrations phase according to ISO11898-1:2015. End of frame phase 453, which may also be referred to as the arbitration phase at the end of frame 450, 460, has inter alia the following portions: an ACK field and an end of frame (EOF) indicator. The end of frame phase 453 is not relevant in this context and is therefore not described in more detail.

In the arbitration phase 451, the associated transmitting/receiving device 12, 22, 32 transmits bits of frame 450, 460 at a slower bit rate than in the data phase 452. In the case of CAN FD, the data phase 452 is temporally markedly shorter than the data phase 452 of the classical CAN frame. In particular application cases, the two bit rates of phases 451, 452 may be configured to the same values, but usually the bit rate in the data phase 452 is considerably higher than in the arbitration phase 451.

For CAN XL, a frame format is defined, in which not only the bit rates within frame 450 or message 45 are switched over, but optionally also the operating mode of transmitting/receiving device 12, 32. In the arbitration phase 451, transmitting/receiving device 12, 32 works in an operating mode (here called CAN) that is compatible to ISO 11898-2:2016. In the data phase 452 of frame 450, transmitting/receiving device 12, 32 may be optionally switched into another operating mode that allows for higher bit rates and thus a fast data transmission.

The arbitration phase 451 is used to negotiate with the aid of an identifier (ID) 451x bitwise between subscriber stations 10, 20, 30 to determine which subscriber station 10, 20, 30 has the message 45, 46 with the highest priority and hence for the time being receives exclusive access to bus 40 of bus system 100 for transmitting at least in the subsequent data phase 452. For this purpose, the conventional CSMA/CR method is applied in the arbitration phase 451, which allows for simultaneous access of subscriber stations 10, 20, 30 to bus 40, without the higher prioritized message 45, 46 being destroyed. This makes it possible in a relatively simple manner to add further bus subscriber stations 10, 20, 30 to bus system 100, which is very advantageous.

In the arbitration phase 451, the associated transmitting/receiving device 12, 22, 32 thus uses a physical layer as in the case of CAN and CAN FD. The physical layer corresponds to the bit transmission layer or layer 1 of the conventional OSI model (open systems interconnection model). If scheduling units 15, 25, 35 are not activated, frames 450, 460 are generated and the bus access of the individual subscriber stations proceeds in an uncoordinated manner. Conflicts in the communication on bus 40 are resolved by an arbitration, as defined in ISO 11898-1:2015.

The CSMA/CR method has the consequence that there must be so-called recessive states on bus 40, which may be overwritten by other subscriber stations 10, 20, 30 having dominant states on bus 40. In the recessive state, highly resistive conditions prevail at the individual subscriber stations 10, 20, 30, which in combination with the parasites of the bus circuit entail longer time constants. This results in a limitation of the maximum bit rate of today's CAN FD physical layer to currently approximately 2 megabits per second in real vehicle usage.

A transmitter of message 45, 46 starts a transmission of bits of data phase 452 on bus 40 only when the corresponding subscriber station 10, 20, 30 as the transmitter won the arbitration and subscriber station 10, 20, 30 as transmitter thus has exclusive access to bus 40 of bus system 100 for transmitting.

Quite generally, in the bus system using CAN XL, the following deviating properties may be implemented in comparison to CAN or CAN FD:

a) take-over and, if indicated, adaptation of proven properties that are responsible for the robustness and user-friendliness of CAN and CAN FD, in particular the frame structure with identifier 451x and arbitration in accordance with the CSMA/CR method, b) increase of the net data transmission rate, in particular to approximately 10 megabits per second, c) increase of the size of the user data per frame, in particular to approximately 4 kbyte.

FIG. 3 shows a case for a communication on bus 40, in which scheduling units 15, 25, 35 are activated. In this case, a deterministic bus access of each of the subscriber stations 10, 20, 30 is possible. For this purpose, a transmission round or cycle C is used in the communication on bus 40, in which in the simplest case one time slot S is available for each of subscriber stations 10, 20, 30. The number SN of time slots S thus corresponds to the number N of subscriber stations 10, 20, 30 on bus 40. The bandwidth on bus 40 is divided by the number N of subscriber stations 10, 20, 30.

In the example of FIG. 3, there are four time slots S, namely, time slots S1, S2, S3, S4, so that four arbitrary subscriber stations of subscriber stations 10, 20, 30 are present. The four arbitrary subscriber stations of subscriber stations 10, 20, 30 are thus referred to below as subscriber stations 1, 2, 3, 4.

Quite generally, SN time slots S may be provided, SN being an arbitrary natural number. The number of time slots S is constant in the example of FIG. 3, that is, it is the same in very cycle C. Alternatively, the number of time slots S may be varied, however.

There exists at least one master subscriber station on bus 40. The master subscriber station may be any subscriber station of subscriber stations 10, 20, 30, i.e., the subscriber station is both master as well as normal subscriber. At the start of every cycle C, the master subscriber station transmits a start frame, which is referred to below as SOCR (start of cycle frame). In one development, the SOCR is a frame having a high priority identifier ID and a short data field DF. In particular, the data field DF may have the minimum length in bus system 100, in particular 0 byte. All subscriber stations 1, 2, 3, 4 on bus 40 synchronize to the SOCR and thereby know when they are allowed to transmit something.

Scheduling units 15, 25, 35 effect a generation of frames 450, 460 according to the following rules.

Each frame 450, 460 again starts with an arbitration phase 451. The identifier 451x may be chosen arbitrarily for each frame 450, 460 as long as the rule, customary in CAN, is observed, that each identifier 451x is used exclusively only by one of subscriber stations 1, 2, 3, 4.

The minimum time slot duration T_S_mn is at least one arbitration bit time, that is, as long as the bit time of a bit in arbitration phase 451. The maximum time slot duration T_S_mx is equal to the maximum length of a frame 460 or 450. The minimum cycle duration T_C_mn is thus equal to the sum of all minimum time slot durations T_S_mn plus the minimum duration of one SOCR. Furthermore, the maximum cycle duration T_C_mx is equal to the sum of all maximum time slot durations T_S_mx plus the maximum duration of one SOCR.

Each subscriber station 1, 2, 3, 4 may transmit on bus 40 only in the time slot S1, S2, S3, S4 that is provided for the subscriber stations 1, 2, 3, 4. In the present exemplary embodiment, each subscriber station 1, 2, 3, 4 may transmit a single frame 450, 460 on bus 40 in the time slot S1, S2, S3, S4 provided for it.

In its time slot S1, S2, S3, S4, each of the subscriber stations 1, 2, 3, 4 respectively has one transmit opportunity TO. Thus, the subscriber station 1, 2, 3, 4 may transmit a frame 450, 460 in the time slot S1, S2, S3, S4 assigned to it, or it may let the opportunity for transmission elapse. Following a minimum time slot duration T_S_mn, the transmit opportunity TO has elapsed.

In the example of FIG. 3, the minimum cycle duration T_C_mn is four arbitration bit times plus the time duration of one SOCR, because 4 time slots S1, S2, S3, S4 are available for the four subscriber stations 1, 2, 3, 4. The minimum time slot duration T_S_mn is assumed as larbitration bit time.

The following basic assumptions apply to the present exemplary embodiment. In the first cycle C, that is, after the bus system 100 is switched on, time slots S1, S2, S3, S4 are assigned to the individual subscriber stations 1, 2, 3, 4. The assignment occurs dynamically via the frame Ids or identifiers 451x, which subscriber stations 1, 2, 3, 4 use for transmitting their first frame 450, 460. The transmission order is determined by the arbitration, which corresponds to the assignment of time slots S1, S2, S3, S4 to the subscriber stations 1, 2, 3, 4.

If subscriber stations 1, 2, 3, 4 are not switched on simultaneously, the assignment of time slots S1, S2, S3, S4 is completed only when the last subscriber station 1, 2, 3, 4 has been switched on and when every subscriber station 1, 2, 3, 4 has transmitted a frame 450, 460. The assignment of time slots S1, S2, S3, S4 to subscriber stations 1, 2, 3, 4 is maintained in the subsequent cycles C. That is, there is no new arbitration and the transmission order remains unchanged. If one or several of the subscriber stations 1, 2, 3, 4 go to sleep and wake up again, a reintegration is performed with the aid of the SOCR, which specifies the start of each cycle C. This will also be described in more detail later with reference to FIG. 4. If a subscriber station has forgotten its time slot assignment, then it is also able to integrate in the same manner as when it is first switched on, which is described below with reference to FIG. 3. In this case, the transmission order is determined by the utilized frame identifier 451x and by arbitration on bus 40.

In the communication on bus 40, the SOCR is distinguishable from other frames. This may be effected for example by using a special frame identifier 451x. In particular, the frame identifier 451x has the highest priority and thus the corresponding priority ID. This frame identifier 451x must then be known to all subscriber stations 1, 2, 3, 4 on bus 40. Alternatively, this may also be effected for example by a special value in the data type field DT in the frame, which is evaluated accordingly by all subscriber stations 1, 2, 3, 4 on bus 40. Alternatively or additionally, a predetermined bit in the frame may be used in order to transport the information that this frame is an SOCR. Then, for example, for this predetermined bit, the value 0=no SOCR and the value 1=SOCR. Alternatively or additionally, it is possible to use a bit or byte in the data field DF for identifying the SOCR.

It is possible that the SOCR contains a varying amount of information in its data field DF. In the present exemplary embodiment, no information is contained in the data field DF of the SOCR. Thus, in this variant, no further information is communicated to the subscriber stations 1, 2, 3, 4 aside from the start of the next cycle C. This has the advantage that the SOCR uses as little communication bandwidth as possible.

FIG. 3 shows a start cycle C_SU, in which in a time duration T_C_SU, the assignment of time slots S1, S2, S3, S4 to subscriber stations 1, 2, 3, 4 is determined. As mentioned previously, each cycle C starts with an SOCR. If one of the subscriber stations 1, 2, 3, 4 receives the SOCR, then this subscriber station 1, 2, 3, 4 is prepared to approve one of the time slots S1 through S4 for transmission, as described in more detail below. The time slot, in which the SOCR is transmitted/received, corresponds to a time slot "S0". For the sake of simplicity, it is assumed in the example of FIG. 3 that all subscriber stations 1, 2, 3, 4 want to transmit a frame 450, 460 right at the start.

In time slot S1, all subscriber stations 1, 2, 3, 4 start a frame simultaneously and participate in the bus arbitration, as illustrated by A1234 in FIG. 3. Subscriber station 4 wins the arbitration A and transmits its frame. This is illustrated in FIG. 3 by TX4, TX4 standing for the transmission signal TX of subscriber station 4 and the frame being based on transmission signal TX4. Time slot S1 is thereby assigned to subscriber station 4.

In time slot S2, subscriber stations 1, 2, 3 start a frame simultaneously and participate in the bus arbitration, as illustrated by A123 in FIG. 3. Subscriber station 2 wins the arbitration and transmits its frame. This is illustrated by TX2 in FIG. 3. Time slot S2 is thereby assigned to subscriber station 2.

For time slot S3, an arbitration is performed between subscriber stations 1, 3, as described above. Finally, in the example of FIG. 3, time slot S3 is assigned to subscriber station 1.

Time slot S4 is assigned to subscriber station 3. An arbitration is no longer performed because the other subscriber stations 1, 2, 4 do not transmit anything in time slot S4.

Hence, the TX transmission order is specified by the arbitration hereinafter as TX_4_2_1_3.

Subsequently, a normal operation of bus system 100 can begin. A possible cycle C in the operation could be a cycle C_B, which is illustrated in FIG. 3 in the right section of the figure. In the cycle C_B, the TX transmission order continues to be specified without change as TX_4_2_1_3. Subscriber stations 3, 4 transmit in cycle C_B. Subscriber stations 1, 2, on the other hand, do not transmit. Subscriber stations 3, 4 thus make use of their transmit opportunity TO. Transmit stations 1, 2, however, let their transmit opportunity TO elapse. This yields an average cycle duration T_C_B. The maximum cycle duration T_C_mx results when in every time slot S1 through S4 the associated subscriber station 1, 2, 3, 4 transmits a frame 450, 460 of the maximum length. The number 1 in time slot S3 indicates that this time slot is assigned to subscriber station 1. The number 2 in time slot S2 indicates that this time slot is assigned to subscriber station 2. This similarly applies to time slots S1 and S4 and subscriber stations 3, 4.

For implementing the previously described scheduling for a transmission of frames 450, 460 on bus 40, each of the scheduling units 15, 25, 35 is constructed as described below.

Every master subscriber station 1, 2, 3, 4 on bus 40 knows the number SN of time slots S1, S2, S3, S4 per cycle C. In the simplest case, the number of subscriber stations 1, 2, 3, 4 on bus 40 corresponds to the number of time slots S1, S2, S3, S4 per cycle C, so that this yields a 1-1 association of time slots and subscriber stations. The number SN of time slots S1, S2, S3, S4 per cycle C is stored in scheduling units 15, 25, 35 of the at least one master subscriber station.

Generally, any subscriber station of bus system 100 may take over the functions of the master subscriber station described above and below. The master subscriber station and a normal subscriber station are thus not two separate subscriber stations. One subscriber station is thus able to assume both functions, e.g., subscriber station 1 could additionally also be the master subscriber station.

The normal operation for a subscriber station 1, 2, 3, 4 starts as soon as the subscriber station 1, 2, 3, 4 knows which time slot number is assigned to it. According to FIG. 3, this is the case when the subscriber station 1, 2, 3, 4 has transmitted its first frame. Since every cycle begins with an SOCR, the master subscriber station sets the count value Scnt of counting module 15, 25, 35 to Scnt:=1 after transmitting the SOCR. Furthermore, every subscriber station 1, 2, 3, 4 sets the count value Scnt of the counting module 15, 25, 35 of its scheduling unit 15, 25, 35 to Scnt:=1 after receiving the SOCR. From now on, counting module 151, 251, 351, using at least one counter, counts the number of received frames 450, 460 on bus 40 and the number of elapsed transmit opportunities TO. For this purpose, counting module 151, 251, 351 counts per received frame 450, 460 and per elapsed transmit opportunity TO, so that the count value Scnt of the at least one counter is respectively incremented by 1 and thus Scnt:=Scnt+1.

As soon as the start of frame bit of a frame 450, 460 is transmitted on bus 40, counting module 151, 251, 351 counts the frame 450, 460 as a transmitted frame 450, 460 on bus 40. This also holds true if the transmission is aborted by the transmitter, for example by an error frame 47 due to an error.

If in the counting module 151, 251, 351 of a subscriber station for the count value Scnt==own time slot number, the next time slot is its own time slot. After the count value Scnt==own time slot number, the subscriber station 1, 2, 3, 4 thus has its own transmit opportunity TO in the next time slot. Now the respective subscriber station 1, 2, 3, 4 is able to transmit a frame 450, 460 or let the transmit opportunity TO elapse. Using its counting module 151, 251, 351, the master subscriber station in this case counts from 1 through SN. Using their counting module 151, 251, 351, the simple subscriber stations count from 1 through "own time slot number". After that, the simple subscriber stations, more precisely their counting module 151, 251, 351, may continue to count or not.

If in counting module 151, 251, 351 of a master subscriber station for count value Scnt==SN, then the next time slot is the time slot in which the SOCR must be transmitted. Now the master subscriber station 1, 2, 3, 4 is able to transmit an SOCR frame 450, 460. If there are multiple masters, all master subscriber stations start transmitting the SOCR in this time slot. The arbitration ensures that the SOCR of the highest priority prevails.

Furthermore, scheduling unit 15, 25, 35 of a subscriber station 1, 2, 3, 4 memorizes the count value Scnt as its own time slot number, if the subscriber station 1, 2, 3, 4 was able to transmit a frame. If it lets its transmit opportunity TO elapse, it keeps its own time slot number from the last cycle C.

This is necessary when the transmission order on bus 40 is assigned anew and another arbitration ensues as a result. This may be the case if one of the subscriber stations 1, 2, 3, 4 was woken up again and it then wants to participate again in the bus communication. This is described in more detail below with reference to FIG. 4.

After having been switched on or woken up, the subscriber stations 1, 2, 3, 4 do not know which of the time slots S1, S2, S3, S4 per cycle C is assigned to the respective subscriber station 1, 2, 3, 4.

FIG. 4 shows the case in which subscriber station 3 was initially asleep and was then woken up again. The following description also applies if multiple subscriber stations are switched on again and simultaneously attempt to reintegrate.

At time t1, for example, subscriber station 3 in FIG. 4 has woken up again and is ready to transmit. Up until this point in time and thus also up until the point in time before subscriber station 3 was put to sleep, the transmission order was determined as TX_1_2_3_4, as shown on the left side in FIG. 4 by the numbers in the time slots. Thereupon, subscriber station 3 waits until it receives the SOCR. Since subscriber station 3 forgot its own time slot number, subscriber station 3 attempts to transmit a frame after receiving the SOCR, that is, starting at time t2. Since time slot S1 is assigned to subscriber station 1, however, and since the latter also attempts to transmit its frame, this results in an arbitration on bus 40.

In the example of FIG. 4, an arbitration therefore occurs in a time slot S1 between the frames 450, 460 of subscriber stations 1, 3, as illustrated by A13 in FIG. 4. In the example of FIG. 4, the frame of subscriber station 1 wins the arbitration, so that ultimately transmit signal TX1 of subscriber station 1 is transmitted in time slot S1 and subscriber station 1 keeps its time slot S1.

Since the frame of subscriber station 3 lost the arbitration, subscriber station 3 repeats the transmission of its frame until the frame has won the arbitration and subscriber station 3 is able to transmit its frame or aborts the transmission attempt due to a bus error. Every subscriber station 1, 2, 3, 4 is able to transmit a frame in a cycle C.

For this reason, the frames of subscriber stations 2, 3 arbitrate in time slot S2, as illustrated by A23 in FIG. 4. In the example of FIG. 4, the frame of subscriber station 2 wins the arbitration, so that ultimately transmit signal TX2 of subscriber station 2 is transmitted in time slot S2. Consequently, subscriber station 2 also keeps its time slot S2.

In the next time slot S3, only subscriber station 3 attempts to transmit its frame. The other subscriber stations 1, 2, 4 do not transmit in time slot S3, since time slot S3 was previously assigned to subscriber station 3. Therefore, no arbitration occurs in time slot S3. Subscriber station 3 is thus able to transmit its frame and has recovered its time slot S3.

Thereupon, normal operation may also begin again for subscriber station 3, since the subscriber station 1, 2, 3, 4 knows again which time slot S1, S2, S3, S4 is assigned to it, i.e., what is its own time slot number.

The frame identifier 451x may be chosen arbitrarily for each frame 450, 460 as long as the rule, customary in CAN, is observed, that each identifier 451x is used exclusively only by one subscriber station 1, 2, 3, 4. Alternatively, it is possible, however, that every subscriber station 1, 2, 3, 4 uses only one single identifier 451x for transmitting all of its frames.

In deviation from the example of FIG. 4, the following holds. If subscriber station 3 had used a higher priority frame identifier 451x than subscriber station 1, then subscriber station 3 would have been able to transmit its frame already in time slot S1. Subscriber station 3 thus would have taken over time slot S1 from subscriber station 1. In this case, subscriber station 1 would have been able to transmit its frame at the latest in time slot S3, since in time slot S3 no other subscriber station 2, 3, 4 would transmit at that time.

Depending on the result of the arbitration, this makes it possible to distribute the assignment of the time slots S1, S2, S3, S4 anew.

One advantage of this exemplary embodiment is that its implementation requires little expenditure in the configuration. In the simplest case, in which exactly one time slot S1, S2, S3, S4 is assigned to each subscriber station 1, 2, 3, 4, the bus system 100 does not require configuration for the described communication with the scheduling units 15, 25, 35. It suffices that only the master subscriber station knows the number N of subscriber stations on bus 40 and thus knows the number SN.

A further advantage of the present exemplary embodiment is that, due to the arbitration, the communication on bus 40 is self-organizing, since the assignment of time slots S1, S2, S3, S4 to the subscriber stations 1, 2, 3, 4 occurs dynamically via the arbitration.

The worst case delay for the bus access of a subscriber station 1, 2, 3, 4 is approximately the same as in PLCA of 10BASE-T1S, namely, 2*SN maximum frame lengths plus the frame length of the SOCR.

Furthermore, the present exemplary embodiment has in particular the following advantage. If, due to an error in one of the scheduling units 15, 25, 35, a subscriber station transmits in the wrong time slot, then this merely results in an arbitration and in a possible delay of the transmission. Such an error, however, cannot result in the destruction of the two frames on the bus, which may result in a loss of data.

According to a modification of the first exemplary embodiment, at least one backup master is provided. This means that even for this case there is at least one master subscriber station on bus 40 that regularly transmits the SOCR. The backup master also uses a fixed frame identifier 451x for the SOCR. As a result, no "single point of failure" can occur, in which no master subscriber station would be present. The at least one backup master may be implemented by one of the subscriber stations 10, 20, 30 of bus system 100.

Each backup master uses a predetermined frame identifier 451x for the SOCR it transmits. Ideally, the frame identifiers 451x of the backup masters have a lower priority than the frame identifiers 451x of the master subscriber station.

If the master subscriber station fails, there are two possibilities as to how the at least one backup master can fill in.

According to a first variant, the master subscriber station and all backup masters always start the SOCR simultaneously. Since the master subscriber station and all backup masters use different frame identifiers 451x and since the frame identifier 451x of the master subscriber station has the highest priority, the master subscriber station wins the arbitration. The backup masters recognize this and undertake no further SOCR transmission attempt in this cycle C. On the basis of the frame identifier 451x, every subscriber station 1, 2, 3, 4 on bus 40 recognizes which master transmitted the SOCR.

According to a second variant, the backup masters check whether the designated master transmits the SOCR or does not transmit as expected. The "not transmitting" is recognized by the backup masters following the expiration of a predetermined waiting time (timeout). The predetermined waiting time (timeout) is one arbitration bit time, for example. Following the predetermined waiting time (timeout), the backup master steps into the breach and transmits its SOCR, so that the "single point of failure" may be avoided.

FIG. 5 shows a time sequence in bus system 100 for illustrating a communication according to a second exemplary embodiment.

In contrast to the time sequence of the communication according to the preceding exemplary embodiment, in the present exemplary embodiment, the respective time slot number is already predefined in a fixed manner. This is achieved in that definitively assigned time slot numbers are used on bus 40. This makes a reintegration method superfluous in the present exemplary embodiment, since every subscriber station 1, 2, 3, 4 of bus 40 knows its assigned time slot S1, S2, S3, S4.

The assignment of the time slots may occur implicitly, time slot 1 being assigned to subscriber station 1 for example, time slot 2 being assigned to subscriber station 2 etc., as shown for example in FIG. 5.

Alternatively, the time slots may be assigned explicitly, communicated in particular in the SOCR.

If the assignment occurs explicitly by way of the SOCR, information is transmitted in the data field DF of the SOCR. In this connection, it is possible that the data field DF of the SOCR contains the number SN of the time slots and the time slot assignment to the subscriber stations of bus 40. Accordingly, the number SN of the time slots is communicated to the subscriber stations 1, 2, 3, 4 with the data field DF of the SOCR in the now following cycle as well as the assignment of the time slots to the subscriber stations of bus 40. In this case, there exists the option that the number SN of the time slots and the time slot assignment to the subscriber stations of bus 40 may be defined at will in each cycle C and may thus differ in every cycle C.

For example, the number SN of the time slots in the cycle that is now beginning is contained in the first byte in the data field DF of the SOCR. Furthermore, the subsequent bytes in the data field DF of the SOCR may contain the assignment of the time slots to the subscriber stations of bus 40. Thus, for example, following byte 0, byte 1 in data field DF contains the assignment of time slot S1 to a subscriber station number, byte 2 contains the assignment of time slot S2 to a subscriber station number, etc.

This makes it possible in operation to increase or decrease in a very simple manner the bandwidth, that is, the number and/or length of the time slots S1, S2, S3, S4, which are guaranteed to a subscriber station 1, 2, 3, 4 of bus 40. The length of the time slots S1, S2, S3, S4 is here provided by the length of the at least one transmitted frame. It is possible, for example, to switch to a special operating mode, in particular flashing in a workshop, where the transmitter is granted a particularly high bandwidth. Alternatively or additionally, a reaction to a safety emergency is possible. Such an emergency could be the failure of a component. In such a circumstance, it is possible to prohibit a rather unimportant subscriber station from communicating entirely or at least partially. This makes it possible to allocate bandwidth to additional frames.

Through the evaluation of the information regarding the assignment of time slots S1, S2, S3, S4, for example from the SOCR received from bus 40, the assignment of time slots S1, S2, S3, S4 in cycle C becomes visible to the respective subscriber station 1, 2, 3, 4 of bus 40. The procedure is thus as follows.

In the operation of bus 40 in accordance with FIG. 5, every subscriber station 1, 2, 3, 4 on bus 40 or, more precisely, every scheduling unit 151, 251, 351 knows that a new cycle C always begins with an SOCR. Every subscriber station 1, 2, 3, 4 on bus 40 or, more precisely, every scheduling unit 151, 251, 351 knows which time slots S1, S2, S3, S4 is assigned to the subscriber station. Every subscriber station 1, 2, 3, 4 on bus 40 or, more precisely, every scheduling unit 151, 251, 351 thus knows in which time slots S1, S2, S3, S4 the subscriber station is allowed to transmit.

Due to the fact that time slots S1, S2, S3, S4 are already assigned to subscriber stations 1, 2, 3, 4 and that every subscriber station 1, 2, 3, 4 always transmits only in its time slot, no arbitration occurs. It is thus not necessary to distinguish between the two cases "reintegration after being switched on" and "normal operation". There exists only the normal operation, which was already described with reference to the first exemplary embodiment.

According to FIG. 5, time slot S1 is assigned to subscriber station 1, time slot S2 is assigned to subscriber station 2, time slot S3 is assigned to subscriber station 3 and time slot S4 is assigned to subscriber station 4. This is illustrated on the left side of FIG. 5. The assignment occurred e.g. by configuration of the scheduling unit.

In the example of FIG. 5, subscriber station 3 is switched on and is ready at time t4 to participate in the CAN communication. Subsequently, subscriber station 3 waits for the SOCR for example. Upon receiving the SOCR, subscriber station 3 is synchronized. Subscriber station 3 thereupon waits for the time slot assigned to it, that is, for time slot S3 in the example of FIG. 5. Starting at time t5, subscriber station 3 is able to transmit its frame.

In the second exemplary embodiment, the subscriber station number is thus predetermined by the system integrator or by the configurator of bus system 100. The order of the communication on bus 40 is therefore no longer self-organizing, but rather it is predetermined, namely, via the assignment of the subscriber station number and optionally additionally via the information in the SOCR. The subscriber stations are then only allowed to transmit in a predetermined order.

This variant of an embodiment is also more robust with respect to the counting of the time slots since the assignment of the time slots is already firmly specified. Furthermore, the third exemplary embodiment also has in particular the aforementioned advantage that no frame is destroyed if due to an error in one of the scheduling units 15, 25, 35, a subscriber station transmits in the wrong time slot. Such an error merely results in an arbitration, but not in the destruction of the two frames on the bus.

FIG. 6 shows a time sequence in bus system 100 for illustrating a communication according to a third exemplary embodiment.

In contrast to the time sequence of the communication according to the previous exemplary embodiment, in the present exemplary embodiment it is also possible that, after being switched on or woken up, a subscriber station 1, 2, 3, 4 is even more quickly synchronized to the time slot number than in the previous exemplary embodiments.

Hence, in the present exemplary embodiment, a subscriber station number is transmitted as an additional item of information in the frames 450, 460. It may thus be seen on bus 40 or by evaluating the frame received from bus 40, which subscriber station 1, 2, 3, 4 of bus 40 is currently transmitting. Consequently, every subscriber station 1, 2, 3, 4 knows which subscriber station 1, 2, 3, 4 is currently transmitting and thus what number the current time slot S1, S2, S3, S4 has. To this end, the following procedure is followed in the present exemplary embodiment.

The subscriber station number may be transmitted in different places in frame 450, 460. For example, the priority ID, which is the same as frame identifier 451x, may correspond to the subscriber station number of subscriber station 1, 2, 3, 4. Alternatively or additionally, the subscriber station number may be transmitted in the data field DF or via the DataType field DT.

In the example of FIG. 6, the assignment of time slots S1, S2, S3, S4 to subscriber stations 1, 2, 3, 4 may be seen on the left side of FIG. 6. Time slot S1 is assigned to subscriber station 1 etc., and time slot S4 is assigned to subscriber station 4.

Subscriber station 3 is switched on and in the example of FIG. 6 is ready at time t6 to participate in the CAN communication. Subsequently, subscriber station 3 waits for the SOCR or for a different frame, in order to synchronize to the time slot numbers. At time t7, subscriber station 3 has received a frame from subscriber station 2. As soon as subscriber station 3 has received the subscriber station number transmitted in the frame of subscriber station 2, subscriber station 3 knows that the time slot that has just elapsed is time slot S2. Subscriber station 3 is thereby synchronized to the time slot numbers. Since in this example time slot S3 follows immediately afterwards, the subscriber station is able to transmit its frame in time slot S3 with transmission signal TX3. If subscriber station 2 had let its transmit opportunity TO elapse, subscriber station 3 would have received the SOCR a few bits later and would thus also be synchronized to the time slots S.

It is very advantageous in the third exemplary embodiment that on account of the subscriber station number transmitted in time slot S1, S2, S3, S4, a subscriber station 1, 2, 3, 4 that has been switched on again or woken up is synchronized more quickly to the firmly assigned time slot numbers S1, S2, S3, S4 or to the time slot numbers S1, S2, S3, S4 present in the communication on bus 40 than in the previous exemplary embodiments. The worst case delay for the bus access of a subscriber station 1, 2, 3, 4 is thus reduced to 1*SN maximum frame lengths plus the frame length of the SOCR. The worst case delay is thus shorter by approximately half than in the preceding exemplary embodiments.

This variant of an embodiment is also more robust with respect to the counting of the time slots since the time slot number may be seen on bus 40. Furthermore, the present exemplary embodiment also has in particular the aforementioned advantage that no frame is destroyed if due to an error in one of the scheduling units 15, 25, 35, a subscriber station transmits in the wrong time slot. Such an error merely results in an arbitration, but not in the destruction of the two frames on the bus.

FIG. 7 shows a time sequence in bus system 100 for illustrating a communication according to a fourth exemplary embodiment. For this purpose, FIG. 7 shows in its left section a cycle having a minimum cycle time duration T_C_mn, in which all time slots S1 through S4 respectively have at least two arbitration bit times. For example, time slot S3 has a first bit time B1_S3 and a second bit time B2_S3. The same is true for the other time slots S1, S2, S4.

A subscriber station 1, 2, 3, 4, which has its transmit opportunity TO in a time slot S1, S2, S3, S4, must start its frame in the first bit of the time slot S1, S2, S3, S4 assigned to it, in order to be guaranteed to be able to transmit a frame. Thus, no bit elapses in time slot S1, S2, S3, S4. If a subscriber station 1, 2, 3, 4 lets the first bit of its time slot S1, S2, S3, S4 elapse, then the subscriber station 1, 2, 3, 4 has also let its transmit opportunity TO elapse, which would have guaranteed the subscriber station 1, 2, 3, 4 the transmission of a frame. Thus, subscriber station 1, 2, 3, 4 currently does not want to transmit a frame.

Consequently, another subscriber station 1, 2, 3, 4 is now able to use this time slot S1, S2, S3, S4 for transmission. It is possible, however, that for example the subscriber station 1 lets its first bit time B1_S1 of its time slot S1 elapse, but then actually begins to transmit a frame in the second bit time B2_S1 of its time slot S1. In this example, it is thus possible for all subscriber stations 1, 2, 3, 4 to start a frame in the second bit time B2_S1 of time slot S1. The frames may also "fight" over this free time slot S1, that is, arbitrate on bus 40. In order for the frame having the highest priority to win the arbitration, subscriber stations 1, 2, 3, 4 may use identifiers 451x for their frames that begin in the second bit of a time slot, which match the priority of the frame. The arbitration ensures that the frame of the highest priority prevails.

This development of the minimum duration T_S_mn of time slots S1 through S4 makes it possible for one of the subscriber stations 1, 2, 3, 4 to use the transmit opportunity TO of another subscriber station, because it is clear from a first bit time that elapsed unused that the respective subscriber station has not used its guaranteed transmit opportunity TO.

In the example of FIG. 7, subscriber station 4 uses the fourth time slot S4 that is assigned to it for transmitting the transmission signal TX4 in a frame. At a time t8 during time slot S4, subscriber station 3 is ready to transmit a frame. Since subscriber station 1 does not transmit a frame—the first bit time B1_S1 elapsing unused—starting at time t9, subscriber station 3 transmits the transmission signal TX3 as a frame in the second bit time B2_S1 of time slot S1. The second and third time slots S2, S3 are respectively used by the associated subscriber stations 2, 3. Transmit signals TX2, TX3 are thus respectively transmitted in a frame on bus 40. Since subscriber station 4 does not transmit a frame—the first bit time B1_S4 elapsing unused—subscriber stations 1, 2 transmit frames on bus 40 starting at time t10. In the subsequent arbitration, subscriber station 2 prevails, so that transmission signal TX2 is transmitted as a frame on bus 40 in time slot S4.

One advantage of the present exemplary embodiment is that it is possible to mix a deterministic allocation of the communication bandwidth with a best effort data traffic. The best effort data traffic only comes about if some subscriber stations 1, 2, 3, 4 do not use the bandwidth, that is, the transmission slot S1, S2, S3, S4, allocated to them.

Another great advantage of the present exemplary embodiment is that the worst case delay for the bus access increases thereby only minimally. The time delay increases minimally because the subscriber stations first wait one bit time before they use another time slot.

In principle, the minimum time slot duration T_S_mn may alternatively have a length of three or more arbitration bit times. Subscriber stations 1, 2, 3, 4 on bus 40 may then be divided into different priority classes. The lower the priority class of a subscriber station 1, 2, 3, 4, the later the subscriber station 1, 2, 3, 4 may start a transmission within a time slot that remains free.

According to a modification of the present exemplary embodiment, the development having at least two bit times may be used so that subscriber stations 1, 2, 3, 4, after waking up or being switched on, are reintegrated in such a way that a transmitting subscriber station 1, 2, 3, 4 is not disadvantaged in that the time slot S1, S2, S3, S4 assigned to it is taken away from the transmitting subscriber station 1, 2, 3, 4. For this purpose, preferably every subscriber station 1, 2, 3, 4 uses for reintegration only time slots S1, S2, S3, S4 that were not used in the first bit by the actual time slot owner. If the reintegrating subscriber station of the subscriber stations 1, 2, 3, 4 transmits its frame starting with the second bit of time slot S1, S2, S3, S4 and if it wins the arbitration and is able to transmit the frame successfully, that is, error-free, then the time slot is subsequently assigned to it.

FIG. 8 shows a time sequence in bus system 100 for illustrating a communication according to a fifth exemplary embodiment.

In contrast to the preceding exemplary embodiments, in the present exemplary embodiment, the communication bandwidth on bus 40 is not uniformly distributed between subscriber stations 1, 2, 3, 4. Instead, in the present exemplary embodiment, a so-called WRR method (weighted round robin method) is used. In the process, each subscriber station 1, 2, 3, 4 obtains a further parameter W (weight), which is adjustable in the associated scheduling unit 15, 25, 35 during the configuration. The parameter W indicates the number of frames 450, 460, which the subscriber station 1, 2, 3, 4 may transmit per cycle. W time slots are provided for one subscriber station 1, 2, 3, 4. For this reason, the parameter SN set in the at least one master subscriber station now no longer corresponds to the number of subscriber stations 1, 2, 3, 4, but rather to the sum of all values of parameter W.

FIG. 8 shows an example with four subscriber stations 1, 2, 3, 4, in which the parameter W=2 is set for subscriber station 1. For the other subscriber stations 2, 3, 4, on the other hand, a parameter W=1 is respectively set. The number SN of time slots thus computes as SN=2+1+1+1=5. Consequently, a cycle C has a number of 5 time slots, namely, S1, S2, S3, S4, S5. In this case, subscriber station 1 is able to transmit two frames 450, 460 per round, namely, in time slots S1 and S2. The other subscriber stations 2, 3, 4 are each able to transmit only one frame 450, 460 per cycle C.

For explaining a sixth exemplary embodiment, FIG. 9 shows a differential voltage V-diff, which is computed from the difference of bus signals CAN_H and CAN_L on bus 40.

According to FIG. 9, a subscriber station 1, 2, 3, which is not using its transmit opportunity TO, transmits a short dominant pulse P at the beginning of bits B1_S1, B1_S2, B1_S3, etc., in its time slot S1, S2, S3. In the example of FIG. 9, only one bit, namely, the bit B1, is transmitted in each time slot S1, S2, S3, since the minimum time slot duration T_S_mn is assumed here to be an arbitration bit time. The bits are scanned by the receiving subscriber stations 1, 2, 3 at a scanning time t_A. If the minimum duration T_S_mn of a time slot corresponds to multiple arbitration bit times, then the subscriber station, to which the time slot is assigned, is able to transmit a dominant pulse P at the beginning of each bit if the subscriber station lets its transmit opportunity TO elapse.

In this case, the associated subscriber station 1, 2, 3 transmits a dominant pulse P of e.g. 200 ns in the recessive bits of its time slot S1, S2, S3. All CAN subscriber stations 1, 2, 3 synchronize to the recessive-dominant edge S_F of the dominant pulse P. Since the arbitration bit time is limited to 1000 ns or 1 Mbit/s in accordance with the aforementioned specification, a corresponding pulse P of 200 ns is not limiting. All subscriber stations 1, 2, 3 scan the actually recessive bit B1 as recessive in spite of the dominant pulse P, because at scanning time t_A, the pulse P has already ended long ago.

This makes it possible that subscriber stations 1, 2, 3 do not lose the synchronization to time slots S1, S2, S3, even if long idle phases occur in the communication on bus 40, in which all subscriber stations 1, 2, 3 do not use their transmit opportunities TO. By way of the dominant pulses P, subscriber stations 1, 2, 3 may be kept synchronized.

Bus system 100 is thus able to handle clock pulses that have relatively high tolerances. In this case, subscriber stations 1, 2, 3 synchronize to recessive-dominant edges on bus 40.

According to a seventh exemplary embodiment, it is possible that one or multiple subscriber stations 1, 2, 3, 4 of the preceding exemplary embodiments transmit multiple frames per time slot S1, S2, S3, S4. This development is advantageous for example in order to distribute the communication bandwidth on bus 40 more fairly, when for example subscriber station 1 typically transmits short frames 460 and subscriber station 2 typically transmits long frames 450. If each subscriber station 1, 2 is always only able to transmit one frame in the time slot S1, S2 assigned to it, then subscriber station 1 has less bandwidth than subscriber station 2 in the method according to the first through the third exemplary embodiment.

In order to achieve greater fairness with regard to the communication bandwidth than in the first through the third exemplary embodiments, subscriber station 1 is for example permitted to transmit multiple short frames 450 during its time slot S1. In order to remain fair, frames 450 in sum total should not be longer than a frame 450 of maximum length.

The fact that an additional frame 460 is transmitted by subscriber station 1 in this transmit opportunity TO may be signaled in the following ways.

For example, an identifier 451x may be used for this purpose. In this case, the less significant 4 bits of the identifier (ID) 451x are used to identify subscriber station 1. The next 7 bits of identifier (ID) 451x are used to communicate that additional frames 460 will follow. 0x14, for example, may signal that subscriber station 4 transmits a frame, the 1 signaling that the frame is followed by additional frames. 0x04 could then signal that subscriber station 4 transmits a frame, the 0 signaling that the frame is not followed by additional frames.

According to another possibility for signaling that subscriber station 1 will still transmit a frame 450 in this transmit opportunity TO, a field DataType (DT) may be used in the header of frame 450. DT=0x30, for example, may signal that no additional frame of the same subscriber station follows. DT=0x31 could therefore signal that one additional frame of the same subscriber station follows.

Alternatively, according to yet another possibility for signaling, it is possible to use a dedicated bit in the header of frame 460.

Alternatively, according to yet another possibility for signaling, it is possible to use a bit or byte at the beginning of the data field DF, shown in FIG. 2, in the data phase 452.

The advantage is that more fairness may be established with regard to the distribution of the communication bandwidth between subscriber stations 1, 2, 3, 4 in the case in which subscriber stations 1, 2, 3, 4 transmit frames 450, 460 of different lengths.

According to an eighth exemplary embodiment, it is possible that the number SN of the time slots is set in the scheduling units 15, 25, 35 to be greater than the number N of subscriber stations. In this case, at least one time slot remains, which belongs to none of the subscriber stations and thus to no one on bus 40. If this is combined with the fourth exemplary embodiment, where it is explained how the other subscriber stations are able to use unused time slots, then the surplus time slots may be used by any subscriber station.

Since in principle all subscriber stations may transmit simultaneously in the surplus time slots and thus arbitrate over bus 40, this corresponds to strict priority scheduling.

The bus has N=4 subscriber stations, for example, that is, the subscriber stations 1, 2, 3, 4, and SN=5 time slots, that is, the time slots S1, S2, S3, S4, S5. One time slot is assigned to each subscriber station exclusively. Since in time slot S5, a node will never transmit immediately, the nodes are able to arbitrate over time slot S5 starting with the second bit of the time slot.

Alternatively, this eighth exemplary embodiment may also be implemented as an extension of the second or third exemplary embodiment. Scheduling units 15, 25, 35 not only have the number SN of time slots configured, but also the number of time slots that are available to all subscriber stations, for example at the end of cycle C. If the time slots are firmly assigned to the subscriber stations as in the second and third exemplary embodiments, the time slot number is optionally contained in the transmitted frame and an SOCR marks the start of a cycle C, then a scheduling unit is able to detect the time slot S5 (from the previous example). When time slot S5 has arrived, all subscriber stations may simply arbitrate here over bus 40. The combination with the fourth exemplary embodiment is no longer necessary.

Since every one of subscriber stations 1, 2, 3, 4 is able to transmit in time slot S5, the allocation of transmit opportunity TO in time slot S5 is strictly in accordance with the priority, that is, the identifier 451x of the frames, which the subscriber stations 1, 2, 3, 4 transmit in time slot S5 (strict priority scheduling). The frame identifier 451x of messages 450, 460 is to be selected in this time slot S5 expediently in accordance with the actual priority of the messages, so that the frame having the highest priority is able to prevail.

According to a ninth exemplary embodiment, it is possible to eliminate the arbitration phase 451 in the communication entirely or at least partially. As a result, in normal operation, even in the first exemplary embodiment, in deterministic scheduling using scheduling units 15, 25, 35, there is no arbitration, because one or multiple time slots S1, S2, S3, S4 are assigned to every subscriber station 1, 2, 3, 4. Consequently, following the assignment of the time slots S1, S2, S3, S4 or at this operating point, the arbitration phase 451 may be omitted entirely or at least partially prior to and following the data phase 452.

As a result, the arbitration phase 451 is now shorter than in CAN, that is, shorter than currently defined in ISO 11898-1:2015.

In such a case, the following two operating modes exist. In a first operating mode, upon being switched on, all subscriber stations 1, 2, 3, 4 use normal CAN frames or CAN XL frames, because arbitration may occur on the bus. As soon as all subscriber stations 1, 2, 3, 4 are in operation and all subscriber stations 1, 2, 3, 4 are synchronized to time slots S1, S2, S3, S4, arbitration will consequently no longer occur. For this reason, the system may now be switched into the second operating mode, in which the arbitration phase 451 is omitted entirely or at least partially.

This makes it possible to avoid the case that the arbitration phase 451 and the frame end phase 453 with their relatively long bits, which are situated before and after the data phase 452, results in a relevant overhead in the data transmission on bus 40 and thus in a lower net data rate.

According to a tenth exemplary embodiment, it is possible that the identifiers 451x, which are used for transmitting the frames 450, 460, are divided into two ranges. First, into a high priority range, which is used for those frames 450, 460 that are transmitted by a subscriber station in the time slot assigned to the subscriber station. And second, into a low priority range, which is used for those frames that are transmitted in a time slot that is not exclusively assigned to the transmitting subscriber station.

In order to attempt to use a time slot that is exclusively assigned to another subscriber station, subscriber station 1 for example, to which for example the currently present time slot S3 is not exclusively assigned, must simply use an identifier 451x from the low priority range when attempting to transmit frame 450, 460. This ensures that for example subscriber station 3, to which in this example the currently present time slot S3 is exclusively assigned, would always win the arbitration and that thus this time slot S3 remains exclusively assigned to subscriber station 3. If, however, in this example at least one of the other subscriber stations 1, 2, 4 has something to transmit, then this other subscriber station 1, 2, 4 may attempt right at the beginning of time slot S3 to transmit a frame 450, 460 with an identifier 451x from the low priority range.

This has the advantage that in the present exemplary embodiment the minimum time slot duration T_S_mn remains at an arbitration bit time, whereas in the fourth exemplary embodiment the minimum time slot duration T_S_mn amounts to two arbitration bit times.

All the previously described developments of subscriber stations 1, 2, 3, 4, 10, 20, 30 of bus system 100 and the methods carried out therein may be used individually or in all possible combinations. In particular, all features of the previously described exemplary embodiments and/or of their modifications may be combined in any manner. Additionally or alternatively, particularly the following modifications are possible.

Although the present invention was described above with reference to the example of the CAN bus system, the present invention may be used in any communication network and/or communication method. In particular, two different communication phases may be used in the communication network and/or communication method, as described above with reference to the communication phases 451, 452.

In particular, bus system 100 according to the exemplary embodiments may be a communication network, in which data are serially transmittable at two different bit rates. It is advantageous, but not an unavoidable presupposition, that in bus system 100, at least for certain time periods, exclusive, collision-free access by a subscriber station 10, 20, 30 to a common channel is ensured.

The number and the arrangement of the subscriber stations 10, 20, 30 in bus systems 100 of the exemplary embodiments is a matter of choice. In particular, subscriber station 20 in bus system 100 may be omitted. It is possible that one or multiple subscriber stations 10 or 30 exist in bus system 100. It is possible that all subscriber stations in bus system 100 are developed identically, that is, that only subscriber stations 10 or only subscriber stations 30 exist.

The deterministic scheduling performed by scheduling units 15, 25, 35 may be switched on or switched off at any time so as to adapt to the current operating states of bus system 100. In real-time operation, for example, the deterministic scheduling is used. The deterministic scheduling may be switched off, on the other hand, in a workshop when flashing new firmware versions.

Additionally or alternatively, it is possible that in an operation of the deterministic scheduling, the previously described parameters SN, W, which are used by scheduling units 15, 25, 35, may be changed as desired in continuous operation.

What is claimed is:

1. A subscriber station for a serial bus system, comprising:
   a communication control device configured to control a communication of the subscriber station with at least one other subscriber station of the bus system;
   a transmitting/receiving device configured to transmit a transmission signal generated by the communication control device in a frame on a bus of the bus system; and
   a scheduling unit configured to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically so that there is a first instance of the cycle and one or more additional instances of the cycle;

wherein:
the scheduling unit is configured to determine, by using at least one item of information received from the bus, an assignment that specifies which time slot of the cycle the transmitting/receiving device may use for transmitting the frame for the transmission signal on the bus;
the assignment is generated in the first instance of the cycle by an arbitration, between transmission requests by the subscriber stations, that assigns to each of the subscriber stations that has provided a respective one of the transmission requests a respective one of the time slots of the first instance of the cycle, the assignment being used in the one or more additional instances of the cycle based on the arbitration that was performed in the first instance of the cycle, without arbitration occurring in the one or more additional instances of the cycle; and
the subscriber station includes at least one of the following five features (a)-(e):
(a) the at least one item of information received from the bus is a frame communicating a start of the cycle, and the at least one item of information received from the bus additionally includes a frame identifier and/or an assignment of the time slots of the cycle to the subscriber stations of the bus and/or information as to which of the subscriber stations of the bus is currently transmitting;
(b) the communication control device is configured to include a subscriber station number in the transmission signal which is assigned exclusively to the subscriber station on the bus, and the scheduling unit is configured to approve a temporal access of the subscriber station to the bus in the time slot assigned to the subscriber station when the scheduling unit is able to evaluate a subscriber station number in a frame received from the bus;
(c) the subscriber station is configured in such a way that the scheduling unit may be switched on or off depending on time requirements of the communication on the bus, or that an operating mode of the scheduling unit is changeable by configuration of predetermined parameters in a continuous operation of the bus system, the operating mode of the scheduling unit setting a predetermined mode of a communication on the bus;
(d) for each of the time slots assigned to the subscriber stations in the first instance of the cycle, the respective subscriber station to which the respective time slot is allotted a predefined transmit opportunity time period, which is shorter than an entirety of the respective time slot, in which to use the respective time slot in the one or more additional instances of the cycle, and, for any respective one of the one or more additional instances of the cycle in which the respective subscriber station does not begin use of the respective time slot within the predefined transmit opportunity, the respective time slot is reassigned for the respective cycle; and
(e) the arbitration is performed in the first instance of the cycle by:
selecting from all of the subscriber stations from which the transmission requests have been received for a temporally first one of the time slots; and
based on the selection performed for the temporally first one of the time slots, selecting, for a temporally second one of the time slots, from all of the subscriber stations from which the transmission requests have been received except for the subscriber station that has already been selected for the temporally first one of the time slots.

2. The subscriber station as recited in claim 1, wherein the at least one item of information received from the bus is the frame communicating the start of the cycle, and the at least one item of information received from the bus additionally includes the frame identifier and/or the assignment of the time slots of the cycle to the subscriber stations of the bus and/or information as to which of the subscriber stations of the bus is currently transmitting.

3. The subscriber station as recited in claim 2, wherein the scheduling unit is configured to use, as the at least one item of information received from the bus, at least the frame informing of a start of the cycle and to evaluate a frame identifier of a transmitter of a frame received from the bus.

4. The subscriber station as recited in claim 2, wherein the scheduling unit is configured to evaluate a data field of the frame informing of the start of the cycle, in which the at least one item of information received from the bus is contained.

5. The subscriber station as recited in claim 1, wherein the scheduling unit is configured to wait until the communication control device has received from the bus a frame informing of the start of the cycle and is configured to subsequently determine, together with other subscriber stations of the bus in an operation of the bus system by using a priority of the transmission signal, which time slot of the cycle the transmitting/receiving device may use for transmitting the frame for the transmission signal on the bus.

6. The subscriber station as recited in claim 1, wherein the communication control device is configured to partition the frame into a first communication phase and a second communication phase at least in a switch-on phase of the bus, and in the first communication phase, a negotiation takes place to determine which of the subscriber stations of the bus is granted an at least temporarily exclusive, collision-free access to the bus in a subsequent second communication phase.

7. The subscriber station as recited in claim 6, wherein a number of the time slots per cycle is greater than a number of time slots, which are assigned to the subscriber stations of the bus per cycle, and in a time slot which is not assigned to any of the subscriber stations of the bus, in the first communication phase, the negotiation takes place to determine which of the subscriber stations of the bus is granted an at least temporarily exclusive, collision-free access to the bus in the subsequent second communication phase.

8. The subscriber station as recited in claim 6, wherein a minimum duration of a time slot is a bit time of a bit of the first communication phase, and the scheduling unit is configured to transmit, in a time slot assigned to the subscriber station, a frame having a priority that is higher than a priority of a frame which the scheduling unit is configured to transmit in a time slot that is assigned to another subscriber station of the bus.

9. The subscriber station as recited in claim 6, wherein a minimum duration of a time slot is two bit times of a bit of the first communication phase, and wherein the scheduling unit is configured to approve a temporal access of the subscriber station to the bus in a second bit of the time slot of the cycle when another subscriber station of the bus lets its transmit opportunity elapse unused in a first bit of the time slot.

10. The subscriber station as recited in claim 1, wherein the scheduling unit includes a counting module which is configured to increment its count value with each frame received from the bus and to increment it with each transmit opportunity that has elapsed unused for a time slot, and the counting module is configured to set its count value to 1 when a frame informing of a start of the cycle is received.

11. The subscriber station as recited in claim 10, wherein the counting module is configured to increment its count value with every frame received from the bus following reception of a bit which signals a beginning of a frame, even if the frame is later aborted, by a subscriber station that transmitted the frame, due to an error.

12. The subscriber station as recited in claim 10, wherein the scheduling unit is configured to approve a temporal access of the subscriber station to the bus for a next time slot of the cycle when the count value of the counting module is equal to the number of the time slot that is assigned to the subscriber station.

13. The subscriber station as recited in claim 1, wherein the communication control device is configured to include the subscriber station number in the transmission signal which is assigned exclusively to the subscriber station on the bus, and the scheduling unit is configured to approve the temporal access of the subscriber station to the bus in the time slot assigned to the subscriber station when the scheduling unit is able to evaluate the subscriber station number in the frame received from the bus.

14. The subscriber station as recited in claim 1, wherein a number of time slots which are assigned to the subscriber station per cycle is at least temporarily unequal to a number of time slots which are assigned to another subscriber station of the bus per cycle.

15. The subscriber station as recited in claim 1, wherein the subscriber station is configured to transmit per time slot more than one frame on the bus, and/or a number of frames which the subscriber station is allowed to transmit per time slot on the bus, is at least temporarily unequal to a number of frames which another subscriber station of the bus is allowed to transmit per time slot on the bus.

16. The subscriber station as recited in claim 1, wherein the communication control device is configured to transmit at a beginning of a recessive bit in the time slot assigned to the subscriber station a dominant pulse that is shorter than a bit time of the recessive bit if the communication control device lets its transmit opportunity elapse unused.

17. The subscriber station as recited in claim 1, wherein the subscriber station is configured in such a way that the scheduling unit may be switched on or off depending on the time requirements of the communication on the bus, or that the operating mode of the scheduling unit is changeable by the configuration of the predetermined parameters in the continuous operation of the bus system, the operating mode of the scheduling unit setting the predetermined mode of the communication on the bus.

18. The subscriber station as recited in claim 1, wherein:
the subscriber station is a master subscriber station configured to transmit a frame which informs the at least one other subscriber station of a start of the cycle of a communication on the bus; and
the at least one other subscriber station at least one backup master for additional execution of a function of the master subscriber station on the bus.

19. The subscriber station as recited in claim 1, wherein, for each of the time slots assigned to the subscriber stations in the first instance of the cycle, the respective subscriber station to which the respective time slot is allotted the predefined transmit opportunity time period, which is shorter than the entirety of the respective time slot, in which to use the respective time slot in the one or more additional instances of the cycle, and, for the any respective one of the one or more additional instances of the cycle in which the respective subscriber station does not begin use of the respective time slot within the predefined transmit opportunity, the respective time slot is reassigned for the respective cycle.

20. The subscriber station as recited in claim 1, wherein the arbitration is performed in the first instance of the cycle by:
the selecting from all of the subscriber stations from which the transmission requests have been received for the temporally first one of the time slots; and
the selecting, based on the selection performed for the temporally first one of the time slots and for the temporally second one of the time slots, from all of the subscriber stations from which the transmission requests have been received except for the subscriber station that has already been selected for the temporally first one of the time slots.

21. A bus system, comprising:
a bus;
at least two subscriber stations connected to one another via the bus in such a way that they are able to communicate with one another serially, each of the at least two subscriber stations including:
a communication control device configured to control a communication of the subscriber station with at least one other subscriber station of the bus system,
a transmitting/receiving device configured to transmit a transmission signal generated by the communication control device in a frame on a bus of the bus system, and
a scheduling unit configured to plan a temporal access of the subscriber station to the bus in at least one time slot of a cycle of temporally consecutive time slots, at least one time slot being provided in the cycle for each subscriber station of the bus for transmitting its transmission signal and the cycle being repeated cyclically so that there is a first instance of the cycle and one or more additional instances of the cycle;
wherein:
the scheduling unit is configured to determine, by using at least one item of information received from the bus, an assignment that specifies which time slot of the cycle the transmitting/receiving device may use for transmitting the frame for the transmission signal on the bus;
at least one of the subscriber stations is a master subscriber station configured to transmit a frame which informs the at least two subscriber stations of a start of the cycle of a communication on the bus;
the assignment is generated in the first instance of the cycle by an arbitration, between transmission requests by the subscriber stations, that assigns to each of the subscriber stations that has provided a respective one of the transmission requests a respective one of the time slots of the first instance of the cycle, the assignment being used in the one or more additional instances of the cycle based on the arbitration that was performed in the first instance of the cycle, without arbitration occurring in the one or more additional instances of the cycle; and the bus system includes at least one of the following five features (a)-(e):

(a) the at least one item of information received from the bus is a frame communicating a start of the cycle, and the at least one item of information received from the bus additionally includes a frame identifier and/or an assignment of the time slots of the cycle to the subscriber stations of the bus and/or information as to which of the subscriber stations of the bus is currently transmitting;

(b) the communication control device is configured to include a subscriber station number in the transmission signal which is assigned exclusively to the subscriber station on the bus, and the scheduling unit is configured to approve a temporal access of the subscriber station to the bus in the time slot assigned to the subscriber station when the scheduling unit is able to evaluate a subscriber station number in a frame received from the bus;

(c) the subscriber station is configured in such a way that the scheduling unit may be switched on or off depending on time requirements of the communication on the bus, or that an operating mode of the scheduling unit is changeable by configuration of predetermined parameters in a continuous operation of the bus system, the operating mode of the scheduling unit setting a predetermined mode of a communication on the bus;

(d) for each of the time slots assigned to the subscriber stations in the first instance of the cycle, the respective subscriber station to which the respective time slot is allotted a predefined transmit opportunity time period, which is shorter than an entirety of the respective time slot, in which to use the respective time slot in the one or more additional instances of the cycle, and, for any respective one of the one or more additional instances of the cycle in which the respective subscriber station does not begin use of the respective time slot within the predefined transmit opportunity, the respective time slot is reassigned for the respective cycle; and (e) the arbitration is performed in the first instance of the cycle by:
  selecting from all of the subscriber stations from which the transmission requests have been received for a temporally first one of the time slots; and
  based on the selection performed for the temporally first one of the time slots, selecting, for a temporally second one of the time slots, from all of the subscriber stations from which the transmission requests have been received except for the subscriber station that has already been selected for the temporally first one of the time slots.

22. A method for communicating in a serial bus system, the method being carried out using a subscriber station of the bus system, the subscriber station including a communication control device and a transmitting/receiving device, the method comprising the following steps:

controlling, using the communication control device, a communication of the subscriber station with at least one other subscriber station of the bus system;

transmitting, using the transmitting/receiving device, a transmission signal, generated by the communication control device, in a frame on a bus of the bus system in accordance with a scheduling of the scheduling unit, which schedules a temporal access of the subscriber station to the bus in at least one time slot of a cycle of temporally consecutive time slots, at least one time slot being provided in the cycle for each subscriber station of the bus for transmitting its transmission signal and the cycle being repeated cyclically so that there is a first instance of the cycle and one or more additional instances of the cycle; and the scheduling unit determining, by using at least one item of information received from the bus, an assignment that specifies which time slot of the cycle the transmitting/receiving device may use for transmitting the frame for the transmission signal on the bus, wherein the assignment is generated in the first instance of the cycle by an arbitration, between transmission requests by the subscriber stations, that assigns to each of the subscriber stations that has provided a respective one of the transmission requests a respective one of the time slots of the first instance of the cycle, the assignment being used in the one or more additional instances of the cycle based on the arbitration that was performed in the first instance of the cycle, without arbitration occurring in the one or more additional instances of the cycle;

wherein the method includes at least one of the following five features (a)-(e):

(a) the at least one item of information received from the bus is a frame communicating a start of the cycle, and the at least one item of information received from the bus additionally includes a frame identifier and/or an assignment of the time slots of the cycle to the subscriber stations of the bus and/or information as to which of the subscriber stations of the bus is currently transmitting;

(b) the communication control device is configured to include a subscriber station number in the transmission signal which is assigned exclusively to the subscriber station on the bus, and the scheduling unit is configured to approve a temporal access of the subscriber station to the bus in the time slot assigned to the subscriber station when the scheduling unit is able to evaluate a subscriber station number in a frame received from the bus;

(c) the subscriber station is configured in such a way that the scheduling unit may be switched on or off depending on time requirements of the communication on the bus, or that an operating mode of the scheduling unit is changeable by configuration of predetermined parameters in a continuous operation of the bus system, the operating mode of the scheduling unit setting a predetermined mode of a communication on the bus;

(d) for each of the time slots assigned to the subscriber stations in the first instance of the cycle, the respective subscriber station to which the respective time slot is allotted a predefined transmit opportunity time period, which is shorter than an entirety of the respective time slot, in which to use the respective time slot in the one or more additional instances of the cycle, and, for any respective one of the one or more additional instances of the cycle in which the respective subscriber station does not begin use of the respective time slot within the predefined transmit opportunity, the respective time slot is reassigned for the respective cycle; and (e) the arbitration is performed in the first instance of the cycle by:

selecting from all of the subscriber stations from which the transmission requests have been received for a temporally first one of the time slots; and based on the selection performed for the temporally first one of the time slots, selecting, for a temporally second one of the time slots, from all of the subscriber stations from which the transmission requests have been received except for the subscriber station that has already been selected for the temporally first one of the time slots.

* * * * *